US005961258A

United States Patent [19]

Ende et al.

[11] Patent Number: 5,961,258

[45] Date of Patent: Oct. 5, 1999

[54] APPARATUS FOR CLAMPING AND BORING WORKPIECES

[75] Inventors: Wolfgang Ende, Neu-Wulmstorf; Harald Schueler, Hamburg, both of Germany

[73] Assignee: DaimlerChrysler Aerospace Airbus GmbH, Hamburg, Germany

[21] Appl. No.: 08/936,159

[22] Filed: Sep. 24, 1997

[30] Foreign Application Priority Data

Sep. 24, 1996 [DE] Germany .............................. 19639122

[51] Int. Cl.[6] ...................................................... B23B 39/00

[52] U.S. Cl. .......................... 408/103; 408/100; 408/112

[58] Field of Search ................................ 408/87, 95, 97, 408/99, 103, 100, 110, 111, 112, 130

[56] References Cited

U.S. PATENT DOCUMENTS

| | | | |
|---|---|---|---|
| 4,657,446 | 4/1987 | Flaten | 408/87 |
| 4,897,000 | 1/1990 | Suzuki | 408/79 |
| 5,161,923 | 11/1992 | Reccuis | 408/72 |
| 5,404,641 | 4/1995 | Bratten et al. | 408/87 |
| 5,584,618 | 12/1996 | Blankenship et al. | 408/1 R |

FOREIGN PATENT DOCUMENTS

| | | |
|---|---|---|
| 4037716 | 4/1992 | Germany . |
| 4217860 | 12/1993 | Germany . |

*Primary Examiner*—Andrea L. Pitts
*Assistant Examiner*—Monica Smith
*Attorney, Agent, or Firm*—W. F. Fasse; W. G. Fasse

[57] ABSTRACT

In order to facilitate and reduce the time necessary for clamping together and boring a hole through at least two workpieces that are to be joined together, for example by rivets or bolts, a portable clamping and boring apparatus carries out all necessary operating steps once it is manually positioned at the intended location of the bored hole. The clamping and boring apparatus includes a tool body with a clamp device and a boring device mounted thereon. The clamp device includes a clamping yoke with a clamp jaw element at an end thereof, and a clamping cylinder that drives the clamping yoke in an axial direction toward the boring location, from an open starting position into a clamping position. The boring device includes a pneumatic boring machine adapted to receive a boring bit, and a boring feed advance drive connected to the boring machine to drive the boring bit in a feed advance direction opposed to and coaxial with the clamping direction of the clamp jaw element. The feed advance drive and the clamping cylinder are operatively coupled or interconnected so that the clamping step and boring step are automatically triggered together in proper sequence. The apparatus is especially suited for automatically clamping together two workpieces and boring holes therethrough, as necessary for forming a riveted connection between the workpieces, particularly in the construction of aircraft components.

18 Claims, 8 Drawing Sheets

APPARATUS FOR CLAMPING AND BORING WORKPIECES

SUMMARY OF THE INVENTION

The invention relates to an apparatus for simultaneously clamping and boring at least two workpieces that are to be connected together, for example by bolts or rivets or the like.

BACKGROUND INFORMATION

In various fields of construction and fabrication using metal workpieces, two or more workpieces are to be joined by a plurality of rivet connections or bolt connections, for which corresponding bored holes must be provided. Particularly in the construction of aircraft components, ribs, spars and the like, which are referred to herein generally as frame members, and corresponding coupling members for such frame members, are riveted together by fastening rivets through appropriately provided bored holes. In order to bore the required holes, several manual operations have conventionally been required, as follows.

Typically, the components to be joined, such as a frame member and a coupling member, are manually positioned and oriented relative to one another and then clamped in the proper position. One of the components, such as the frame member, the coupling member, or a holder, is provided with pre-bored holes, which in turn are transferred or copied onto the frame member components by means of copy boring. After this pre-boring procedure, the pre-bored holes are bored out manually to the final desired dimensions. In order to debur the bored holes and clean any chips or the like from the components, it is necessary to remove the clamping elements and to separate the components that had already been properly positioned and clamped together. After the deburring and chip cleaning process, the frame member and the coupling member are once again positioned and joined together, whereby a sealing compound is applied at least in partial areas of the components between the surfaces to be joined, and then the components are again manually oriented and positioned, and finally clamped together using screw clamps. Then, the rivets are inserted into the thusly prepared bored holes and the riveting process can be carried out. As is apparent from the above description, this known process for preparing bored holes in clamped-together components in order to achieve a riveted connection between the components is very time consuming and thus very cost intensive.

SUMMARY OF THE INVENTION

In view of the above, it is an object of the invention to provide an apparatus that makes it possible to clamp together and bore a hole through at least two workpieces that are to be joined, with a minimum amount of time and effort required for carrying out this procedure. It is a further object of the invention to avoid the need for deburring the bored holes and for removing chips and the like, by preventing the formation or accumulation of burrs and chips in the bored holes or between the workpieces. Furthermore, since at least some locations of workpieces that are to be processed in the above manner, i.e. clamped together and bored, are spatially rather inaccessible, it is a further object of the invention to provide an apparatus by which the necessary tool members can be easily manually positioned at the working location, whereby the apparatus is easily portable and the tool members are arranged in a space-saving manner. Further objects of the invention are to avoid or overcome the disadvantages of the prior art, and to achieve additional advantages, as apparent from the present description.

The above objects have been achieved by an apparatus according to the invention for clamping and boring at least two workpieces that are to be joined together. The apparatus according to the invention includes a base frame or tool body, with a clamping device and a boring device mounted on the tool body. The clamping device includes a clamp yoke with a clamp jaw element at an end thereof, which is driven by a clamping cylinder so that the clamp jaw element moves axially in a direction opposed to the boring feed advance direction that will be discussed below, to move from an open or non-clamping starting position to a clamping position at the working location. The boring device includes a boring or drilling machine adapted to receive a boring or drilling bit, and a feed advance drive that moves the boring machine, or particularly the boring bit, in a feed advance direction from a starting position toward the working location, i.e. in a direction preferably co-axial with but opposed to the clamping motion of the clamp jaw element of the clamp device. Preferably, the feed advance drive of the boring machine is operatively coupled or interconnected with the clamping cylinder of the clamp device, so that the operation of the feed advance drive is interconnected, coupled, or triggered by the operation of the clamping cylinder.

The apparatus according to the invention provides a compact automated unit, which can be used to carry out the necessary clamping and boring of two components that are to be joined together, in a single operation or work step. Namely, in order to clamp together two workpieces and provide a bored hole to receive a rivet or the like, it is simply necessary to manually or automatically place the apparatus of the invention into position at the intended joint location or working location, and to initiate the clamping and boring cycle. The present apparatus then automatically carries out the clamping and boring steps, and avoids the formation of burrs and chips, so that the workpieces do not need to be manually aligned, clamped, pre-bored, finish-bored, disassembled, cleaned, realigned, and reclamped. Thus, all of the above described manually performed steps of the prior art have been automated or totally avoided by the present apparatus.

According to preferred features of the invention, the entire apparatus may be pneumatically actuated, namely the boring machine is a pneumatic boring machine or drill, and the various actuators or drive elements are pneumatic cylinders controlled by respective pneumatic valves. The pneumatic drive for the pneumatic boring machine is actuated or controlled based on a control signal provided by the pneumatic clamping cylinder, for example. Specifically, the piston of the clamping cylinder may actuate a stop in a shut-off valve that interrupts the pressurized air line that drives the pneumatic boring machine. Furthermore, the clamping cylinder and a feed advance cylinder for the boring machine may be so interconnected that once the clamping cylinder has moved the clamp jaw element completely into the clamping position, then pressurized air is provided to the feed advance cylinder in order to advance the boring machine. The feed advance motion may be damped and limited by a hydraulic damper and brake arrangement. In order to control the boring cycle, a self-sustaining impulse valve may be provided for interrupting the supply of pressurized air to the clamping cylinder once the feed advance cylinder has driven the boring machine to its feed advance end position.

BRIEF DESCRIPTION OF THE DRAWINGS

In order that the invention may be clearly understood, it will now be described in connection with example embodiments of an apparatus and method for using the apparatus according to the invention, with reference to the drawings, wherein.

DETAILED DESCRIPTION OF PREFERRED EXAMPLE EMBODIMENTS AND OF THE BEST MODE OF THE INVENTION

Figure 1:
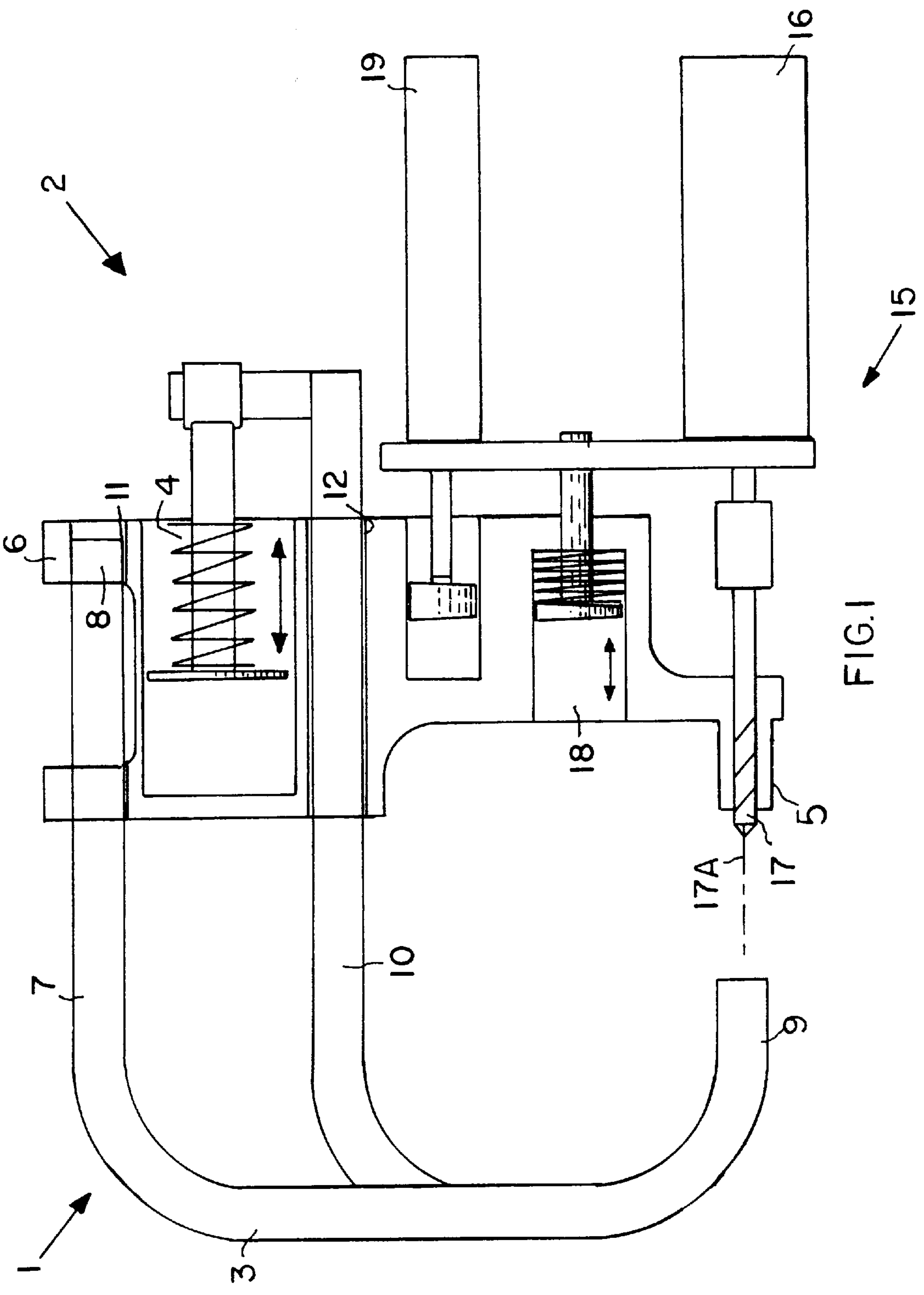
FIG. 1 is a schematic principle sketch of a portable clamping and boring apparatus generally according to the invention, shown partially in section.

FIG. 1 generally shows a portable apparatus for producing connections or joints between structural components, which is generally referred to as a clamping and boring apparatus 1 herein. The present clamping and boring apparatus 1 may, for example, be used to clamp together and bore a hole through two components that are to be joined together, such as a frame member and a frame coupling of an aircraft fuselage structure, in order to produce a riveted connection between the components. FIG. 1 shows a schematic representation of a general construction or configuration of such a clamping and boring apparatus 1, in order to demonstrate the functional principles thereof. The clamping and boring apparatus 1 generally comprises a clamping device 2 and a boring device 15 arranged or mounted on a common tool body 6.

The clamping device 2 essentially comprises a clamping yoke or arm 3 that is carried and driven by a clamping actuator such as a clamping cylinder 4, which is preferably a pneumatic cylinder, which moves the clamping yoke 3 between an open starting position and a closed clamping position. In the illustrated general embodiment, the clamping yoke 3 comprises a substantially C-shaped or U-shaped bent pipe arm 7 having a first pipe end 8 that is guidedly received in a lengthwise or longitudinal guide 11 in the tool body 6, and having an opposite second free pipe end 9 that forms the actual clamp head or clamp jaw element that applies the clamping force to the workpiece.

As a counter member for the clamp jaw element 9, a clamp sleeve 5 is arranged on the tool body in such a position that it opposes and co-axially aligns with the clamp jaw element 9 in the area L of and around the intended boring location of the components that are to be joined. In this manner, the clamp jaw element 9 and the clamp sleeve 5 firmly clamp the components together at and around the boring location, and simultaneously form a sleeve surrounding the boring or drilling bit 17 that is received in the boring device 15. In order to provide chip ejection during the boring process, the clamp sleeve 5 has at least one recess, notch, or opening 14 therein (see e.g. FIG. 2). It is also possible to provide a pressurized air jet or the like, for example the vented pneumatic drive air from the boring machine 16, at the area of the recess or cut-out 14 in the clamp sleeve 5 in order to blow away any chips.

In order to provide a precisely guided movement of the clamping yoke 3, the yoke 3 preferably further includes a second pipe arm 10 that extends substantially parallel to the first pipe end 8, and acts as a second linearly extending guide element received in a corresponding second lengthwise guide 12 extending parallel to the first lengthwise guide 11 in the tool body 6. In the view of FIG. 1, the guides 11 and 12 are incorporated in the upper portion of the tool body 6. In order that the entire clamping and boring apparatus 1 is embodied as a portable and lightweight device, the pipe arms 7 and 10 of the clamping yoke 3 are preferably hollow pipe members made of a material having a high strength and a relatively low weight or density, such as an aluminum alloy or any high strength lightweight alloy known in the aircraft manufacturing field. The clamping cylinder 4 is also arranged on or in the tool body 6 in the upper portion thereof, near the lengthwise guides 11 and 12, and preferably between the lengthwise guides 11 and 12 as shown in FIG. 1. The piston rod of the clamping cylinder 4 is connected to at least one of the pipe arms 7 or 10, so that the movement of the piston rod of the clamping cylinder 4 in turn moves the entire clamping yoke 3 selectively into and between the clamping position and the open starting position.

The boring device 15 essentially comprises a boring machine 16, which is preferably a pneumatic boring machine or drill including a pneumatic drive motor 16A (see FIGS. 2 to 9), a boring or drilling bit 17 mounted in the boring machine, a feed advance cylinder 18, and a damper arrangement 19, and is generally arranged in the lower portion of the tool body 6. The boring axis 17A of the boring bit 17 extends parallel to the lengthwise axes of the lengthwise guides 11 and 12, so that the clamping yoke 3 cooperating with the clamping sleeve 5 surrounding the boring bit 17 can press and clamp together the workpiece components directly at the boring location, with a clamping force that is directed parallel to the boring direction. The boring machine 16, the feed advance cylinder 18, and the pneumatic damper arrangement 19 are mechanically or coupled to each other. In this manner, a precisely defined feed advance motion of the boring machine 16, and particularly its boring bit 17, is achieved, whereby a nearly burr-free boring operation is possible.

Furthermore, the apparatus is so adapted and designed that the clamp jaw element 9 and the clamp sleeve 5 apply a clamping force of approximately 40 to 60 daN therebetween, in order to avoid the formation or accumulation of burrs and/or chips between the joint surfaces of the workpiece components. In this context, the required clamping force must be greater than the cutting force of the boring bit 17 and must be greater than the threshold clamping force required for pressing together the workpiece components tightly enough to avoid any gap or space remaining between the joint surfaces of the workpiece components.

Figure 3:
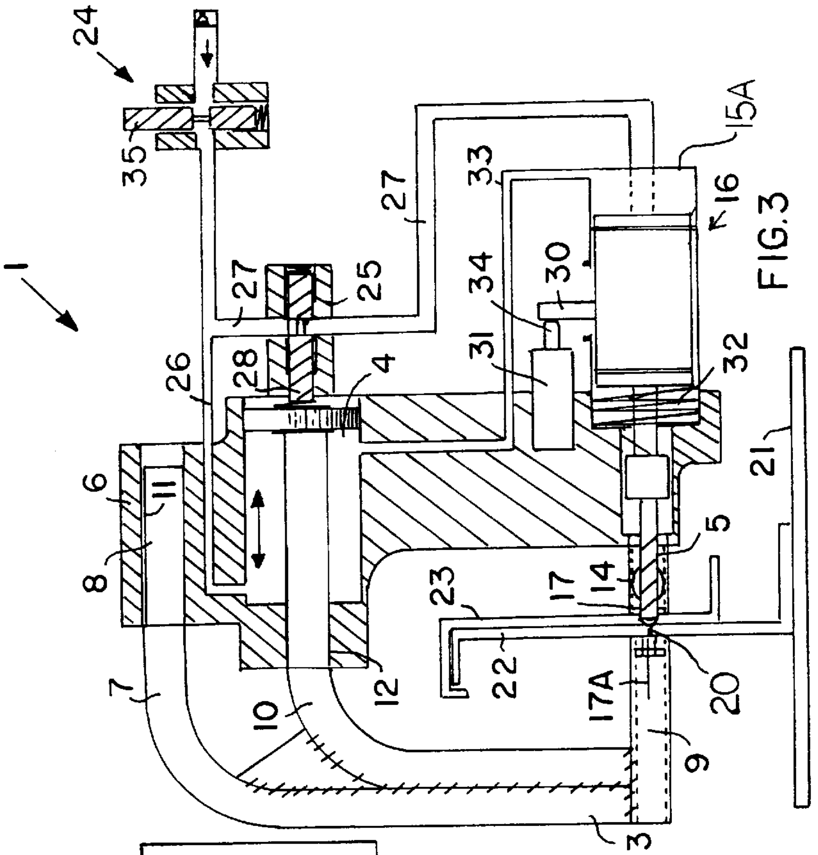
FIG. 3 is a schematic sectional view of the clamping and boring apparatus according to FIG. 2, but shown in a clamping and boring, or working position.
Figure 2:
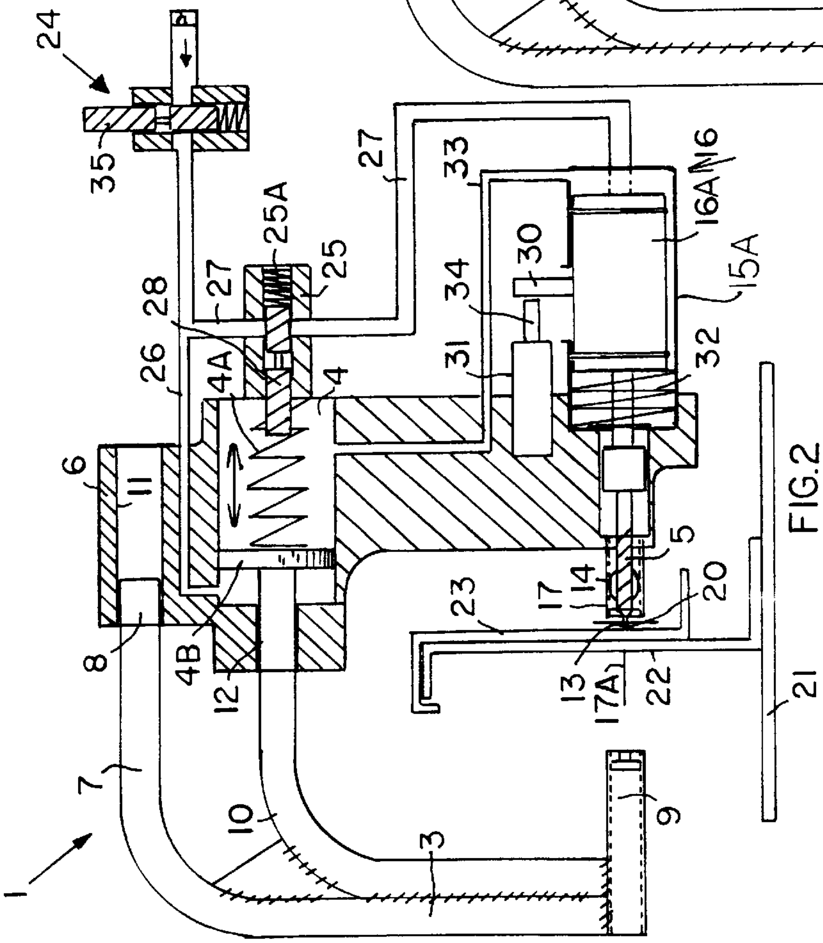
FIG. 2 is a schematic sectional view of a first particular embodiment of a clamping and boring apparatus shown in its starting or rest position.

With reference to FIGS. 2 and 3, the principle steps for carrying out clamping and boring steps to produce a rivet connection between a first workpiece such as an aircraft frame member 22 and a second workpiece such as a frame coupling 23 on an aircraft fuselage skin 21 at an intended joint location or working location 13, using the clamping and boring apparatus 1 according to the invention, will now be described in greater detail. FIGS. 2 and 3 specifically show a first particular embodiment of the clamping and boring apparatus 1. This first particular embodiment differs from the general schematic of FIG. 1, in that the second pipe arm 10 is directly connected in-line with the piston or piston rod of the clamping cylinder 4 in FIG. 2, while a bracket connects the parallel but not coaxial pipe arm 10 and piston rod of the cylinder 4 in FIG. 1. The specific embodiment of FIG. 2 is further characterized in that only the bit tip 20 of the boring bit 17 is exposed, i.e. only the tip 20 of the bit 17 protrudes out of the clamp sleeve 5 that surrounds the bit 17. More particularly, the bit tip 20 is embodied as a guide step or guide tip that serves to properly position the clamping and boring apparatus 1 at an intended joint location, i.e. clamping and boring location 13. In this context, preferably, the bit tip 20 has a brad tip or the like that is inserted into a pre-indentation or pre-bored hole in the second workpiece 23 for properly locating the apparatus.

FIG. 2 shows the portable clamping and boring apparatus 1 in an open, deactivated starting position. The boring bit tip 20 has already been positioned at the intended working location 13. A pneumatic control valve 24 is provided to control the clamping and boring operation, and is shown still closed in the starting position in FIG. 2. In order to carry out the clamping and boring process, as shown in FIG. 3, the control valve 24 is opened by the operator of the tool, so that pressurized air is delivered through the pressurized air line 26 to the clamping cylinder 4. As a result, the piston 4B in the clamping cylinder 4 is driven to the right in FIG. 3, and the clamping yoke 3 is correspondingly moved to the right so that its clamp jaw element 9 contacts and presses against the first workpiece 22. The counter member, namely the clamp sleeve 5, remains in a fixed position relative to the tool body 6 so that the clamp jaw element 9 presses the first workpiece 22 and the second workpiece 23 against the clamp sleeve 5. The pressurized air must be provided to the clamping cylinder 4 at a sufficiently great pressure to achieve an adequate clamping force, for example in the range of approximately 40 to 60 daN, and the clamping force must be maintained until the boring process has been completed. A return spring 4A is provided to return the clamping cylinder 4 and thus the clamping yoke 3 back to its starting position after the pressurized air supply has been shut off or discontinued.

At the end of clamping cylinder 4 opposite the piston rod or second pipe arm 10, a stop member 28 is arranged so as to cooperate with a shut-off valve 25. Once the complete clamping position has been reached, the piston 4B of the clamping cylinder 4 reaches and contacts the stop member 28, which thereby opens the shut-off valve 25 and thus allows pressurized air to flow from the control valve 24 through an air line or conduit 27 to the pneumatic motor 16A of the pneumatically driven boring machine 16. In this manner, the boring process is automatically actuated once the two workpieces are completely clamped together, and the boring process is then automatically carried out while the complete clamping of the workpieces 22 and 23 is maintained.

In order to achieve this, the boring machine 16 is equipped with an automatic feed advance mechanism and automatic damping. The damping is provided by a hydraulic damper and brake 31 which has a piston rod 34 that is already in contact with a stop member 30 of the boring machine 16 in the starting position. A feed advance pressure line 33 provides a connection between the clamping cylinder 4 and a boring feed advance cylinder 15A. Specifically, the feed advance pressure line 33 is connected to the clamping cylinder 4 at such a position that the piston 4B of the clamping cylinder 4 uncovers and opens the inlet end of the feed advance pressure line 33 once the clamping position has been achieved and the piston 4B is shortly before its final end position where it contacts the stop member 28 so as to open the valve 25 for providing pressurized air through the line 27 for driving the boring operation of the boring machine 16. Thus, once the feed advance pressure line 33 is opened, pressurized air is delivered through the conduit 26, through the cylinder 4, through the conduit 33, and to the boring feed advance cylinder 15A so that the pneumatic boring machine 16 is pushed axially in a direction toward the working or boring location 13 so as to provide a feed advance motion of the boring machine 16. The hydraulic damper and brake 31 is adjusted in such a manner that it allows a precisely defined feed advance motion to be carried out, in order to achieve a nearly burr-free boring and thereby avoid the need of any subsequent finishing or reworking of the bored hole. Moreover, the bored hole is produced with a finished fitted-rivet quality, in a single work step or operation.

After completion of the boring operation, the supply of pressurized air is interrupted or shut off. In the illustrated embodiment, this is achieved in that the control valve 24 is embodied as a push switch valve 35, which is simply released after the bored hole has been completed, so that the switch 35 returns under a spring bias and thus interrupts the supply of pressurized air. The clamping cylinder 4, the shut-off valve 25, and the boring machine 16 are each respectively equipped with return springs 4A, 25A, and 32, such that all components automatically return to the respective starting position shown in FIG. 2, once the pressurized air is shut-off. As an alternative according to the invention, an end limit switch may be provided on the boring machine 16 so as to automatically interrupt the supply of pressurized air upon completion of the bored hole.

Figure 4:
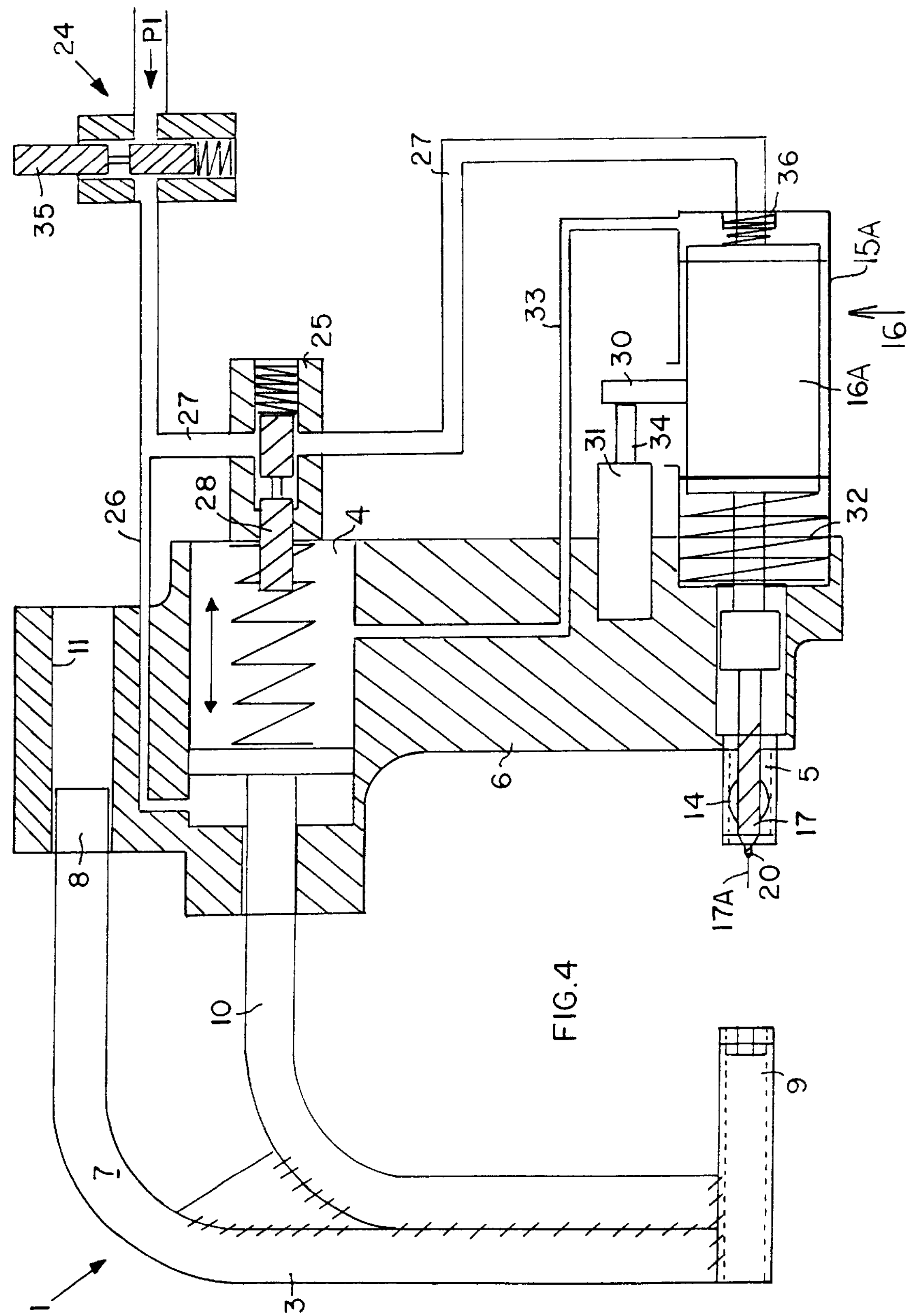
FIG. 4 is a schematic sectional view of the clamping and boring apparatus according to the first embodiment having a first return spring biased boring device.

FIG. 4 shows the clamping and boring apparatus 1 with the return-spring-biased boring machine 16. The basic construction of this apparatus 1 corresponds to the embodiment shown in FIGS. 2 and 3, in which, however only the tip 20 of the boring bit 17 protruded out of the clamp sleeve 5 surrounding the boring bit 17. In contrast, the present embodiment shown in FIG. 4 is for positioning the tool or apparatus 1 at a working or boring location 13 on a workpiece that does not have any pre-indentation or prebored hole in which the boring bit tip 20 could be inserted for guidance. Without providing any spring-back resilience, it would be expected that the boring bit tip 20 could break at the beginning of the clamping and boring process. In order to avoid such a problem, the boring machine 16 includes a set-up or contact spring 36, which provides an axial spring-back resilience for the boring machine 16 and specifically the boring bit 17 over such a spring-back distance as is necessary to allow the clamp sleeve 5 to contact and apply the clamping force to the workpiece while allowing the boring bit tip 20 to be pushed back into the clamp sleeve 5 at this time. In order to achieve this, the set-up or contact spring 36 is stiffer, i.e. has a higher spring characteristic, than the oppositely effective return spring 32.

Figure 5:
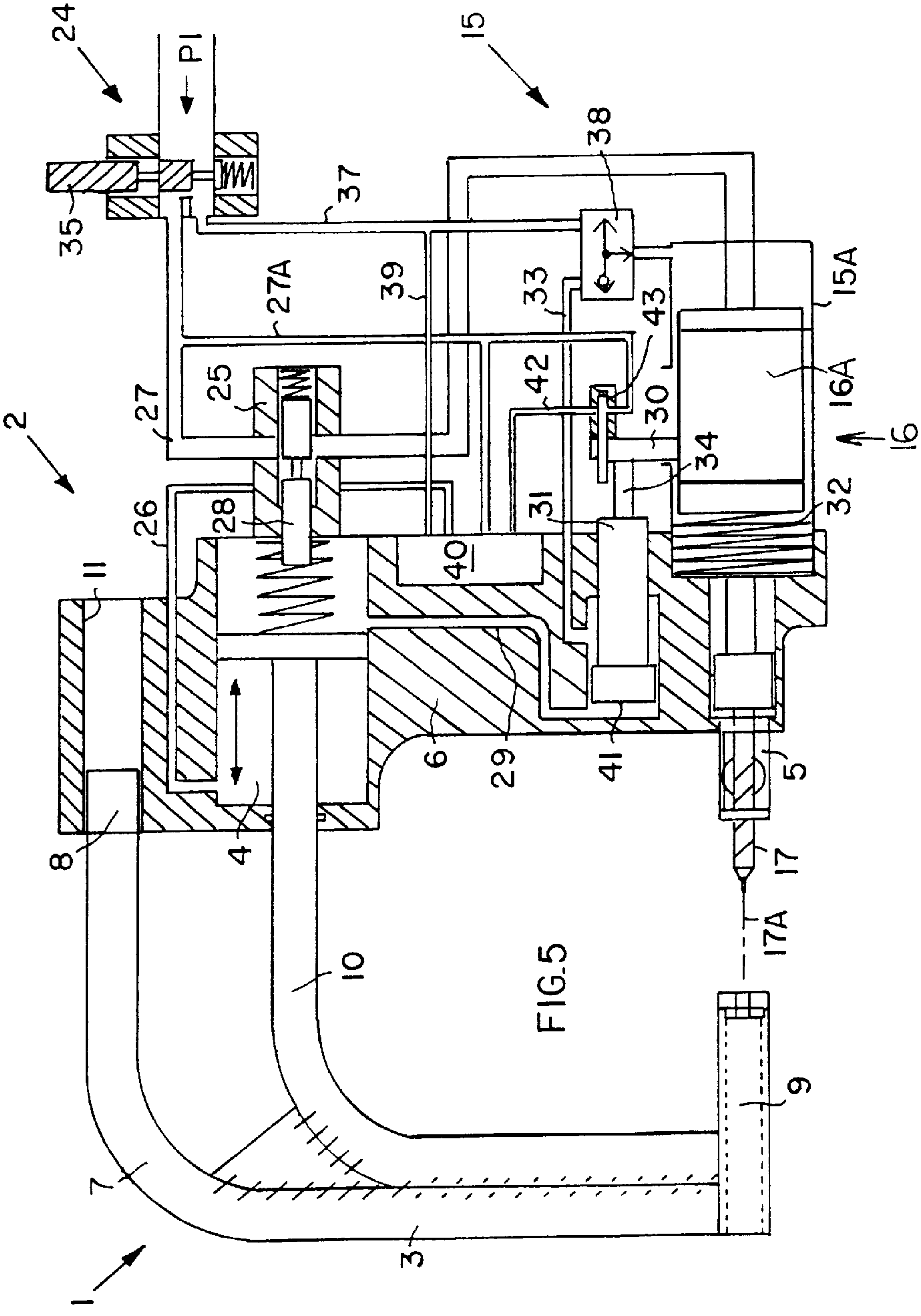
FIG. 5 is a schematic sectional view of a second embodiment of a clamping and boring apparatus according to the invention.

FIG. 5 shows a second particular embodiment of the clamping and boring apparatus 1. This second embodiment is characterized by a free exposed boring bit 17, of which the forward end portion is not surrounded or enclosed by the clamp sleeve 5. This arrangement facilitates the positioning of the boring bit 17, and thus the entire apparatus 1, especially at working locations 13 that are not easily accessible or visible. The arrangement of the basic components of the apparatus 1, such as the clamp device 2 and the boring device 15 is essentially the same as described above in relation to the first particular embodiment shown in FIGS. 2 and 3. However, the present embodiment includes a more complicated control arrangement for automatically carrying out the clamping and boring process using the freely exposed boring bit. For this reason, the present apparatus further includes an impulse valve 40, an OR-valve 38, a shut-off or blocking valve 43 at the feed advance end of the boring machine 16, and various pressurized air and control lines associated therewith. The interconnections of these additional components are as shown in FIG. 5.

The operational principles of this second embodiment of the apparatus 1 will be described with reference to FIGS. 6 to 9, which respectively show successive work step positions of the apparatus throughout a boring cycle. In FIGS. 6 to 9, the pressurized lines or conduits are shown as dotted lines in each case, in order to facilitate or clarify an understanding of the operation of the apparatus.

Figure 6:
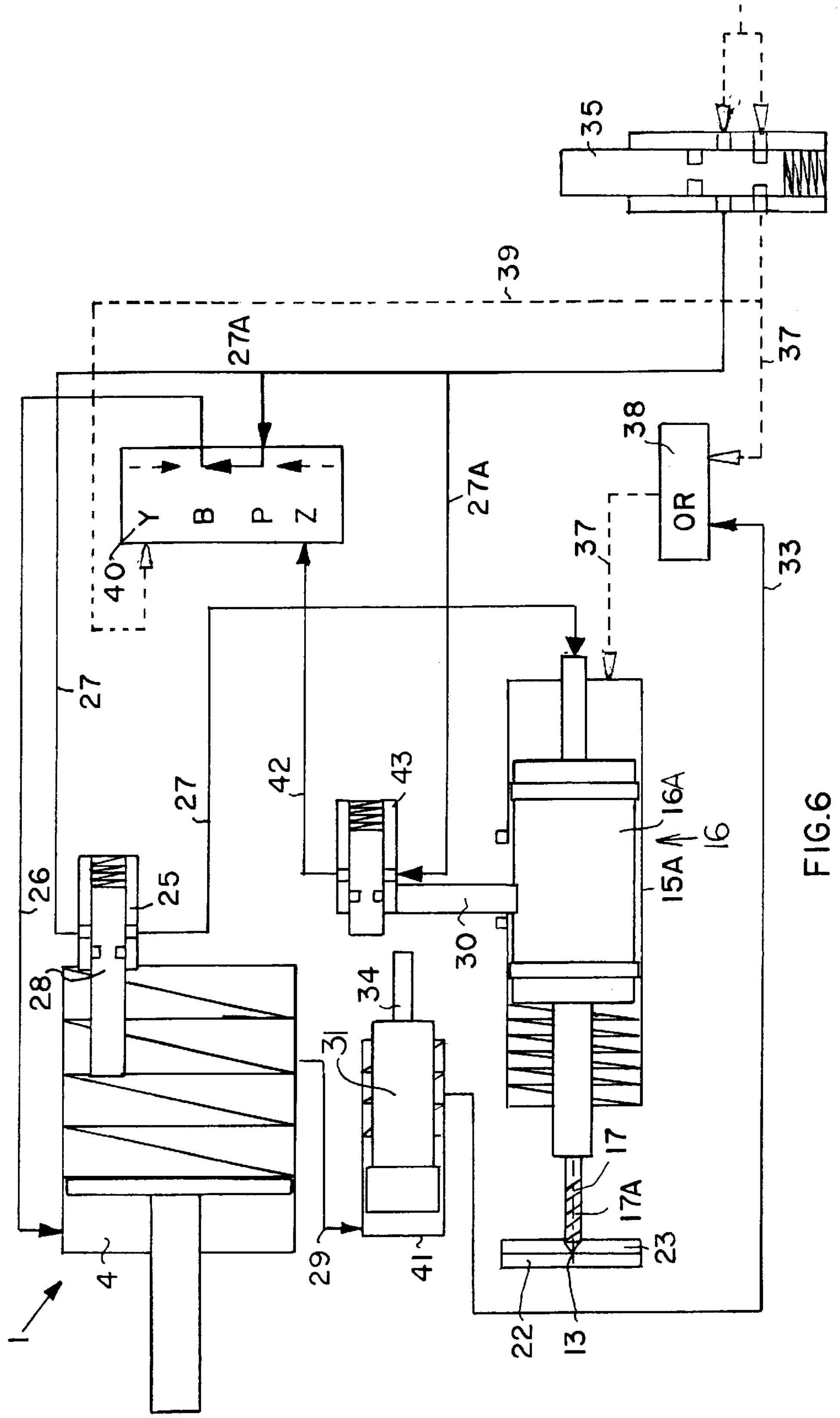
FIGS. 6, 7, 8 and 9 are each respective block circuit diagrams showing the operating principle of a clamping and boring apparatus according to the second embodiment, in four respective successive working positions of a boring cycle.

FIG. 6 is a functional schematic of the clamping and boring apparatus 1 according to the second embodiment, in a starting position. As shown in FIG. 5, pressurized air P1 is preferably provided at a single pneumatic connector leading to the pushbutton or press switch valve 35. In the state of FIG. 6, the valve 35 is not depressed, so pressurized air is not provided through the pressure line 27. However, pressurized air is provided through a pressurized line 37 and through an OR-valve 38 to activate the feed advance of the boring machine 16. Thus, the boring machine 16 and its boring bit 17 are axially extended so that the boring bit 17 protrudes, as described above, and may be easily positioned at the working location 13. However, in this state, the boring drive of the boring machine 16 is not pressurized. Furthermore, in this state, the piston of the clamping cylinder 4 is in its extended position, so that the clamp yoke 3 is in the opened position. The hydraulic brake 31 is retracted into a cylinder 41, so that the piston rod 34 of the hydraulic brake 31 does not yet contact the stop member 30 of the pneumatic boring machine 16.

Figure 7:
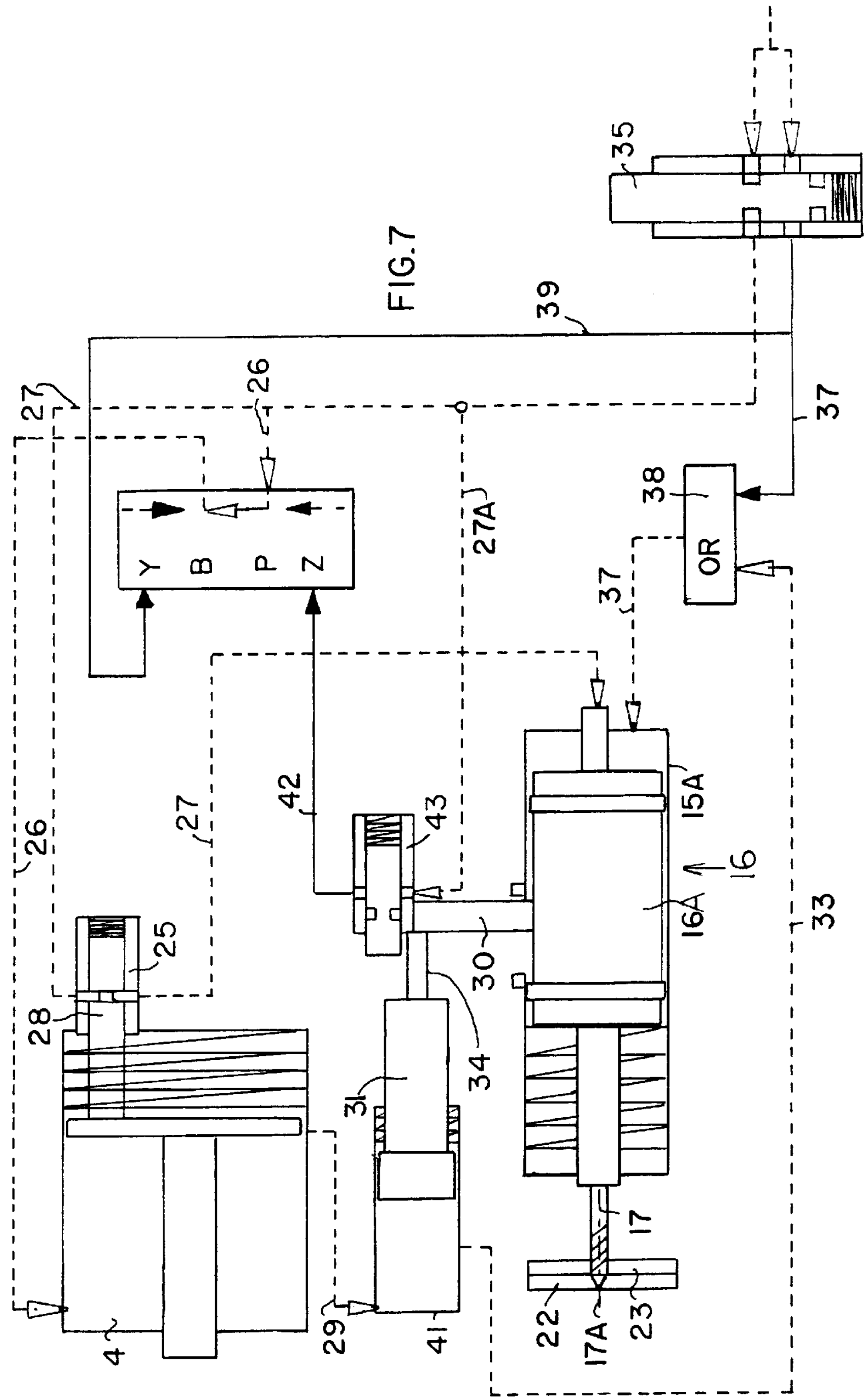

FIG. 7 shows a next step, namely the clamping and boring step, of the operation of the clamping and boring apparatus 1. In this step, as shown, the push-button or press switch valve 35 has been depressed, so that pressurized air is provided into the pressurized air line 26. The self-sustaining impulse valve 40, which is interposed in and can selectively interrupt the pressurized air line 26 leading to the clamping cylinder 4, forms a closed circuit, i.e. the valve is open, in this state. Thus, pressurized air is provided through the air line 26 to the clamping cylinder 4, whereby the piston is pushed into the clamping cylinder 4 so that the clamping yoke 3 clamps together the workpieces 22 and 23. In FIGS. 6 to 9, the clamping operation using the clamping yoke 3 is not shown in detail, but is functionally carried out as described above in relation to FIG. 3.

While carrying out the clamping, the boring machine 16 and its boring bit 17 are pressed axially backward against the feed advance direction, as a result of the arising clamping force. The stop member 28 is arranged at the end of the clamping cylinder 4 opposite the piston rod as described above, to cooperate with the shut-off valve 25. Once the arrangement reaches the clamping position, the piston of the clamping cylinder 4 contacts and presses against the stop member 28, which thereby opens the shut-off valve 25 so as to provide pressurized air through a pressurized air line 27 to the pneumatically driven boring machine 16, so as to drive the same. Furthermore, pressurized air is provided through the pressurized air line 29 to the feed advance cylinder 41 of the hydraulic damper and brake device 31, so as to pressurize the same, once the piston of the clamping cylinder 4 has reached the stop member 28. Thereby, the hydraulic brake 31 is pushed out of the feed advance cylinder 41 so that its piston rod 34 contacts the stop member 30 of the boring machine 16. Similarly, pressurized air is provided through the feed advance line 33 from the pressurized feed advance cylinder 41 through the OR-valve 38 and through the line 37, to the feed advance cylinder 15A of the pneumatic boring machine 16 so as to activate the feed advance of the boring machine 16.

Figure 8:
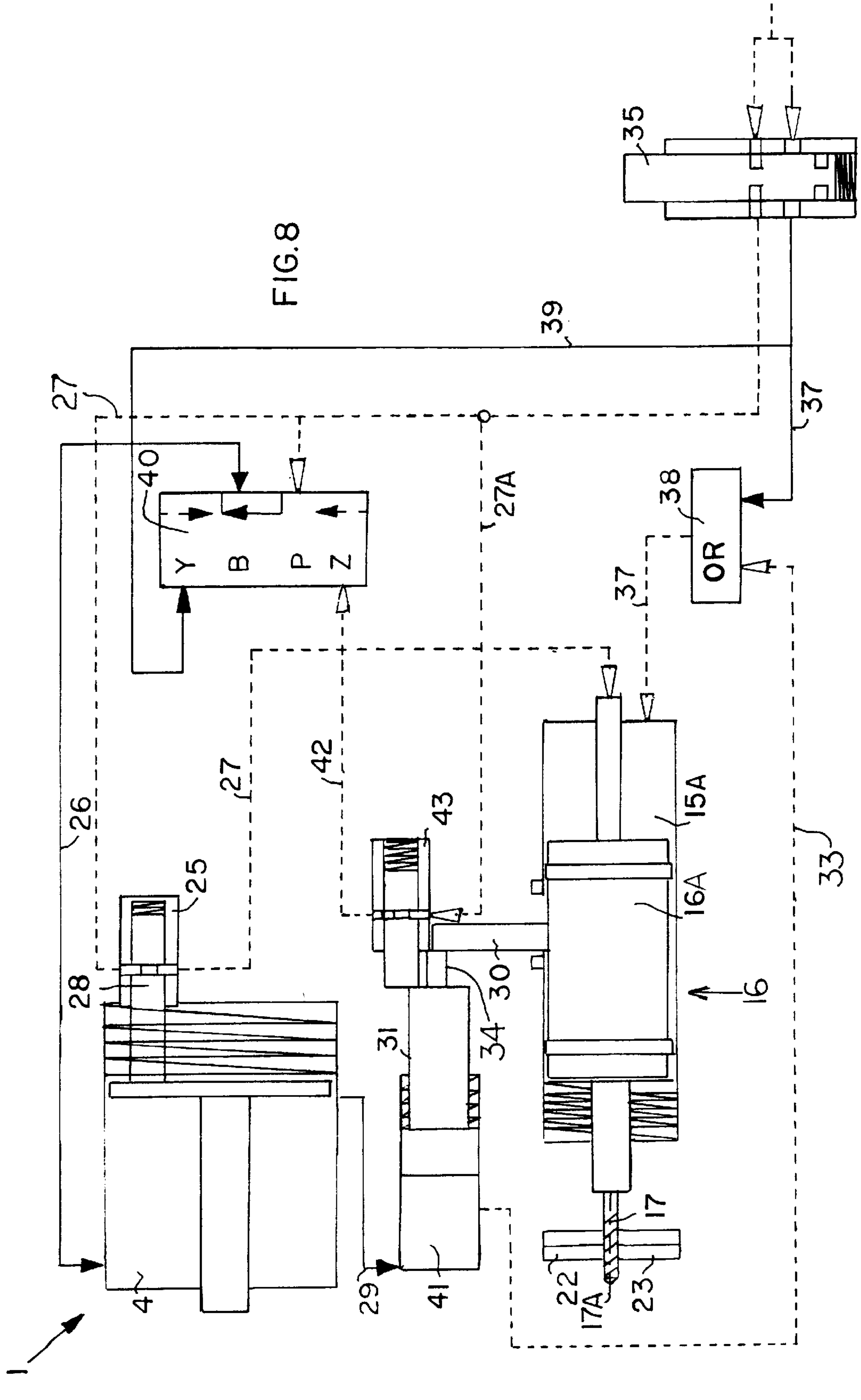

FIG. 8 is a functional schematic showing the clamping and boring apparatus 1 at the end of the boring process. The press switch valve 35 is still being activated or depressed, and the boring machine 16 has just reached its feed advance end position. In this position, the hydraulic brake 31 reaches the shut-off valve 43 and triggers a control signal through the control lines 27A and 42 to the input Z of the impulse valve 40. Responsive thereto, the impulse valve 40 interrupts the connection to the pressurized air line 26 and switches the air line 26 to a depressurized or pressureless condition. This interrupts the clamping force, whereupon the rest of the operating sequence automatically proceeds as will be described next.

Figure 9:
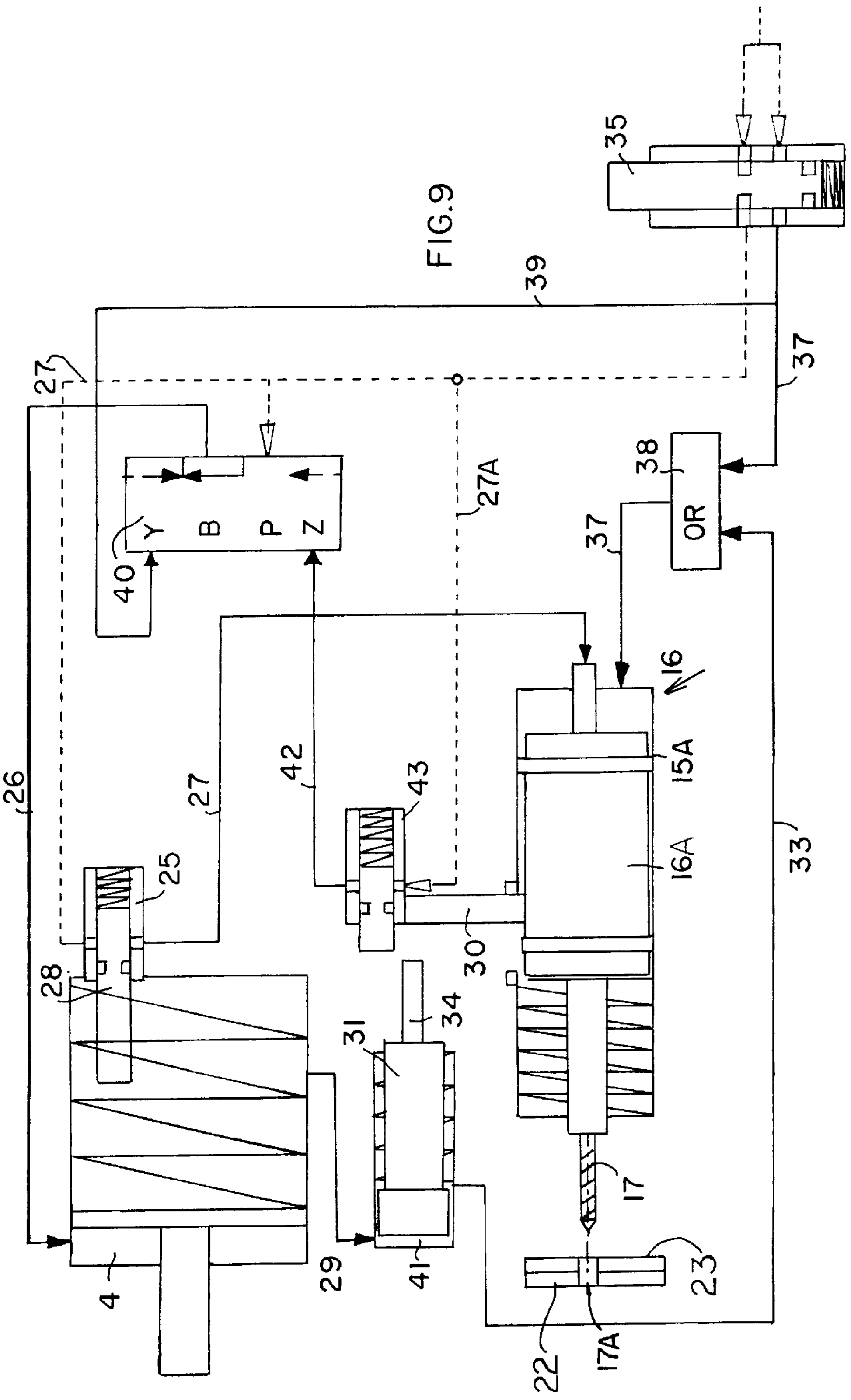

FIG. 9 schematically shows the state of the clamping and boring apparatus 1, as a result of the operation steps that are automatically carried out due to the application of the control signal to the impulse valve 40 as described above. The return spring of the clamping cylinder 4 moves the piston of the clamping cylinder 4 back into the starting position and thus opens the clamping yoke 3. Due to the return motion of the piston in the clamping cylinder 4, the pressurized air supply for the boring feed advance via the air lines 29 and 33 is also interrupted, and the return spring 32 returns the boring machine 16 with its boring bit 17 back into the retracted starting position. The feed advance cylinder 41 is similarly switched to a de-pressurized condition, and as a result the hydraulic brake 31 is retracted.

Further as a result of the retraction of the piston in the clamping cylinder 4, the shut-off valve 25 closes or interrupts the pressurized air line 27 that provides air to drive the boring machine 16, so that the boring machine 16 is also switched to a de-pressurized condition and thus stops the boring operation. This condition or state of the clamping and boring apparatus 1 is the state shown in FIG. 9.

After completion of the boring operation, the boring bit 17 is again pulled out of the bored hole at the working location 13 and reassumes its starting position. At this point in time, the press switch valve 35 is still actuated. However, after completion of the clamping and boring process, the press switch valve 35 is released by the operator, and the pressurized air supply through the pressurized air line 27 is thereby interrupted. Thereupon, the clamping and boring apparatus 1 returns to the starting position shown in FIG. 6. Moreover, pressurized air is now provided through the line 37, and through the OR-valve 38 to the feed advance of the boring machine 16, so that the boring machine 16 with its boring bit 17 is axially extended so that the boring bit 17 protrudes and may easily be positioned at the next working location 13. Via the control line 39, the impulse valve 40 receives a control signal indicating that the valve 40 should once again establish a connection through the pressurized air line 26. Thus, the clamping and boring apparatus 1 is now once again in a state ready to form a new bored hole. This clamping and boring process is then carried out according to the operating steps that have already been described with reference to FIGS. 6 to 9.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An apparatus for clamping and boring workpieces that are to be joined at a joint location on the workpieces, comprising a tool body, and a clamp device and a boring device respectively arranged on said tool body, wherein said clamp device comprises a clamping yoke with a clamp jaw element, and a clamping actuator comprising a pneumatic piston-cylinder device connected to said clamping yoke and adapted to move said clamping yoke so that said clamp jaw element moves in a clamping direction toward the joint location on the workpieces from an open starting position in which said clamp jaw element is disengaged from the workpieces to a clamping position in which said clamp jaw element is clampingly engaged with the workpieces, and wherein said boring device comprises a pneumatic boring machine including a pneumatic drive motor and being adapted to receive a boring bit at a bit end of said boring machine, a feed advance drive connected to said boring machine and adapted to move said boring machine in a feed advance direction opposite said clamping direction toward the joint location on the workpieces from a starting position to a boring position, a boring drive air conduit connected to said pneumatic drive motor, and a boring drive control valve interposed in said boring drive air conduit and control connected to said piston-cylinder device so as to activate said boring drive control valve responsive to operation of said piston-cylinder device.

2. The apparatus according to claim 1, wherein said clamp jaw element is arranged aligned coaxially with said boring machine such that said feed advance direction is coaxial with and oppositely directed relative to said clamping direction.

3. The apparatus according to claim 1, further comprising and in combination with said boring bit.

4. The apparatus according to claim 1, further comprising actuation control lines interconnecting said clamping actuator and said feed advance drive such that actuation of said feed advance drive will be triggered automatically responsive to operation of said clamping actuator.

5. The apparatus according to claim 1, further comprising at least one linear guide element arranged in a first end portion of said tool body, wherein said clamping yoke comprises at least one arm having a first end and a second free end, said first end is guidedly movably received in said linear guide element, said second free end comprises said clamp jaw element, and said at least one arm is connected to said pneumatic piston-cylinder device to be moved by said pneumatic piston-cylinder device.

6. The apparatus according to claim 5, wherein said clamping yoke has a substantially C-shaped configuration comprising two of said arms joined together, wherein said first end of a first one of said arms is received in said linear guide element and a first end of a second one of said arms is connected to said pneumatic piston-cylinder device.

7. The apparatus according to claim 6, wherein said first end of said second one of said arms extends and is connected linearly coaxially with a piston rod of said pneumatic piston-cylinder device.

8. The apparatus according to claim 1, further comprising a clamp sleeve arranged on said tool body coaxially with said clamp jaw element and coaxially with said boring machine at said bit end of said boring machine, such that said clamp sleeve at least partially surrounds the boring bit when the boring bit is received in the bit end of said boring machine, wherein said clamp sleeve forms a clamping counter member that cooperates with said clamp jaw element in said clamping position to clamp said workpieces at and around the joint location between said clamp jaw element and said clamp sleeve.

9. The apparatus according to claim 1, wherein said boring drive control valve comprises an air shut-off valve and a stop member that selectively opens and closes airflow through said air shut-off valve, wherein said stop member is arranged on said piston-cylinder device such that a piston of said piston-cylinder device contacts said stop member so as to open said air shut-off valve when said piston is at an end of its stroke and said clamping yoke has been moved into said clamping position.

10. The apparatus according to claim 1, further comprising a clamping air conduit connected to said pneumatic piston-cylinder device of said clamping actuator, a single air input pneumatic connector connected to said clamping air conduit and to said boring drive air conduit, and a return-spring-biased manual-push-switch air valve interposed between said air input pneumatic connector and said clamping air conduit and boring drive air conduit.

11. The apparatus according to claim 1, wherein said feed advance drive comprises a boring feed advance cylinder, and further comprising a feed advance air conduit connecting said pneumatic piston-cylinder device of said clamping actuator with said boring feed advance cylinder such that pressurized air can flow from said pneumatic piston-cylinder device to said feed advance cylinder and cause said boring machine to move in said feed advance direction when a piston of said pneumatic piston-cylinder device is at an end of its stroke and said clamping yoke has been moved into said clamping position, and further comprising a damper device arranged on said tool body such that said boring machine is pushed against said damper device when said boring machine moves in said feed advance direction.

12. The apparatus according to claim 11, wherein said damper device comprises a hydraulic brake that is adjustable to allow said boring machine to move only a predefined feed advance distance in said feed advance direction.

13. The apparatus according to claim 11, wherein said pneumatic piston-cylinder device of said clamping actuator, said boring feed advance cylinder, and said damper device each respectively comprise a respective return-spring arranged therein.

14. The apparatus according to claim 1, further comprising an air supply conduit connected to said pneumatic piston-cylinder device, a self-sustaining impulse valve interposed in said air supply conduit, and a limit switch valve connected to said impulse valve by a control conduit, wherein said limit switch valve is so arranged and adapted to release a limit signal through said control conduit to said impulse valve when said boring machine reaches an end limit of its motion in said feed advance direction, and wherein said impulse valve is adapted to shut-off an airflow through said air supply conduit upon receiving said limit signal through said control conduit from said limit switch valve.

15. A portable tool for clamping and boring workpieces that are to be joined at a joint location, comprising a tool body, a linear guide bearing in said tool body, a clamping yoke having a free end with a clamp jaw thereon and a connected end that is guidedly movably received in said linear guide bearing, a first pneumatic cylinder device arranged on said tool body and including a piston that is connected to said clamping yoke for moving said clamping yoke to carry out a clamping motion, a clamp counter member having an axial opening therein and being arranged on said tool body opposite and facing said clamp jaw with a space therebetween adapted to receive said workpieces in said space and clamp said workpieces between said clamp jaw and said clamp counter member, a pneumatic boring machine including a pneumatic motor arranged on said tool body and axially aligned with said clamp jaw and said clamp counter member and adapted to receive a boring bit to extend axially through said axial opening in said clamp counter member, a second pneumatic cylinder device arranged on said tool body and connected to said boring machine to move said boring machine to carry out a boring feed advance motion toward said clamp jaw, and at least one pneumatic conduit connecting said first pneumatic cylinder device, said second pneumatic cylinder device and said pneumatic motor in such a manner that pressurized air is provided to said second pneumatic cylinder device and to said pneumatic motor responsive to said first pneumatic cylinder device moving said clamping yoke to carry out said clamping motion.

16. The apparatus according to claim 5, wherein said at least one arm is at least one pipe arm.

17. The apparatus according to claim 6, wherein said two arms are two pipe arms.

18. An apparatus for clamping and boring workpieces that are to be joined at a joint location on the workpieces, comprising a tool body, and a clamp device and a boring device respectively arranged on said tool body, wherein said clamp device comprises a clamping yoke with a clamp jaw element, and a clamping actuator comprising a pneumatic piston-cylinder device connected to said clamping yoke and adapted to move said clamping yoke so that said clamp jaw element moves in a clamping direction toward the joint location on the workpieces from an open starting position in which said clamp jaw element is disengaged from the workpieces to a clamping position in which said clamp jaw element is clampingly engaged with the workpieces, wherein said boring device comprises a boring machine adapted to receive a boring bit at a bit end of said boring machine, and a feed advance drive comprising a boring feed advance cylinder connected to said boring machine and adapted to move said boring machine in a feed advance direction opposite said clamping direction toward the joint location on the workpieces from a starting position to a boring position, further comprising a feed advance air conduit connecting said pneumatic piston-cylinder device of said clamping actuator with said boring feed advance cylinder such that pressurized air can flow from said pneumatic piston-cylinder device to said feed advance cylinder and cause said boring machine to move in said feed advance direction when a piston of said pneumatic piston-cylinder device is at an end of its stroke and said clamping yoke has been moved into said clamping position, and further comprising a damper device arranged on said tool body such that said boring machine is pushed against said damper device when said boring machine moves in said feed advance direction.

* * * * *

UNITED STATES PATENT AND TRADEMARK OFFICE

CERTIFICATE OF CORRECTION

PATENT NO. : 5,961,258

DATED : Oct. 5, 1999

INVENTOR(S) : Ende et al.

It is certified that error appears in the above-identified patent and that said Letters Patent is hereby corrected as shown below:

Col. 4, line 43, after "mechanically" insert --interconnected--.

Signed and Sealed this

Twenty-eighth Day of March, 2000

Attest:

Q. TODD DICKINSON

*Attesting Officer* *Commissioner of Patents and Trademarks*